Figure 1:
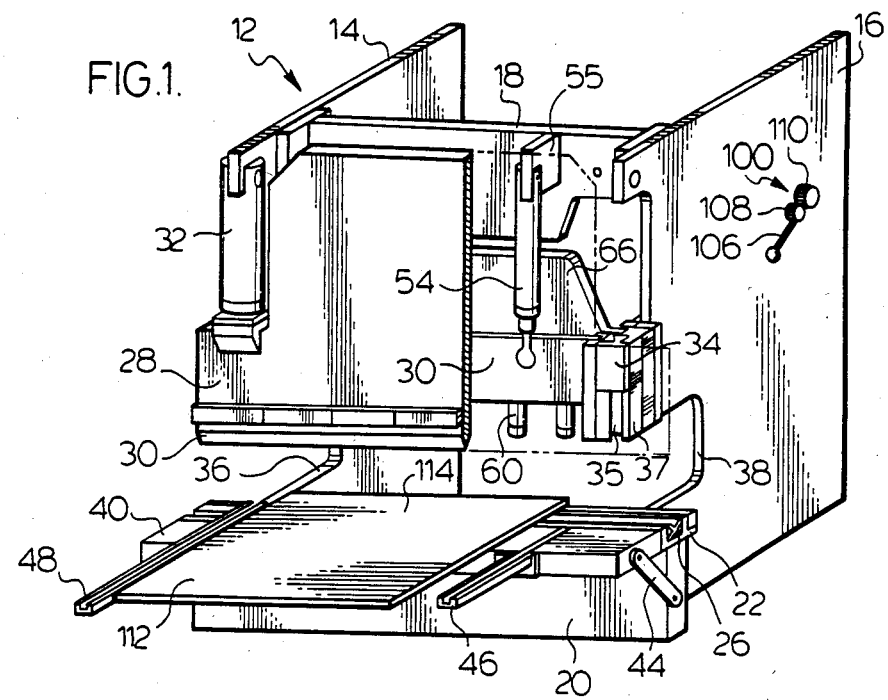

United States Patent [19]

Ebrahimian

[11] Patent Number: 4,738,018
[45] Date of Patent: * Apr. 19, 1988

[54] COMBINED BENDING AND CUTTING MACHINE FOR METAL SHEET AND PLATE

[76] Inventor: Ebrahim Ebrahimian, 1589 Phillbrook Drive, London, Ontario N5X 2S4, Canada

[*] Notice: The portion of the term of this patent subsequent to Mar. 3, 2004 has been disclaimed.

[21] Appl. No.: 878,146

[22] Filed: Jun. 25, 1986

Related U.S. Application Data

[63] Continuation-in-part of Ser. No. 796,340, Nov. 12, 1985, Pat. No. 4,646,420.

[51] Int. Cl.⁴ .......................... B21D 5/01; B23P 23/00
[52] U.S. Cl. ........................................ 29/560; 72/324; 72/464; 83/552
[58] Field of Search ................ 29/560, 560.1; 83/200, 83/552, 564, 598, 599, 694, 699; 72/324, 389, 442, 464

[56] References Cited

U.S. PATENT DOCUMENTS

| | | | |
|---|---|---|---|
| 2,734,572 | 2/1956 | Pater | 83/694 |
| 3,616,525 | 11/1971 | Barthel | 29/560 |
| 3,791,248 | 2/1974 | Pearson | 83/694 X |
| 3,875,655 | 4/1975 | Gerlach | 29/560 |
| 4,506,433 | 3/1985 | Gingras | 29/560 |
| 4,646,420 | 3/1987 | Ebrahimian | 29/560 |

Primary Examiner—Z. R. Bilinsky
Attorney, Agent, or Firm—Robert F. Delbridge; Arne I. Fors

[57] ABSTRACT

A combined bending and cutting machine suitable for bending and cutting metal plate has a frame and a female bending die holder extending transversely across a lower part of the frame and supported thereby. The female die holder has a transversely extending upwardly-open recess for receiving a female bending die. A male bending die holder is mounted on the frame above the female die holder for vertical movement relative to the frame and female die holder, and a male bending die is mounted on a lower end of the male die holder. The male die holder is movable towards and away from the female die holder to bend a metal plate positioned between the male and female bending dies. A transversely extending clamping member above the female die holder is movable towards and away from the female die holder to clampingly engage a metal plate mounted on the female die holder. A shear is mounted behind the clamping member and has a transversely extending cutting member with a first cutting edge, the female bending die holder having a second transversely extending cutting edge at the rear thereof. The cutting member is movable downwardly to cause the first cutting edge to engage the metal plate behind the clamp and cooperate with said second cutting edge to cut through the metal plate.

8 Claims, 6 Drawing Sheets

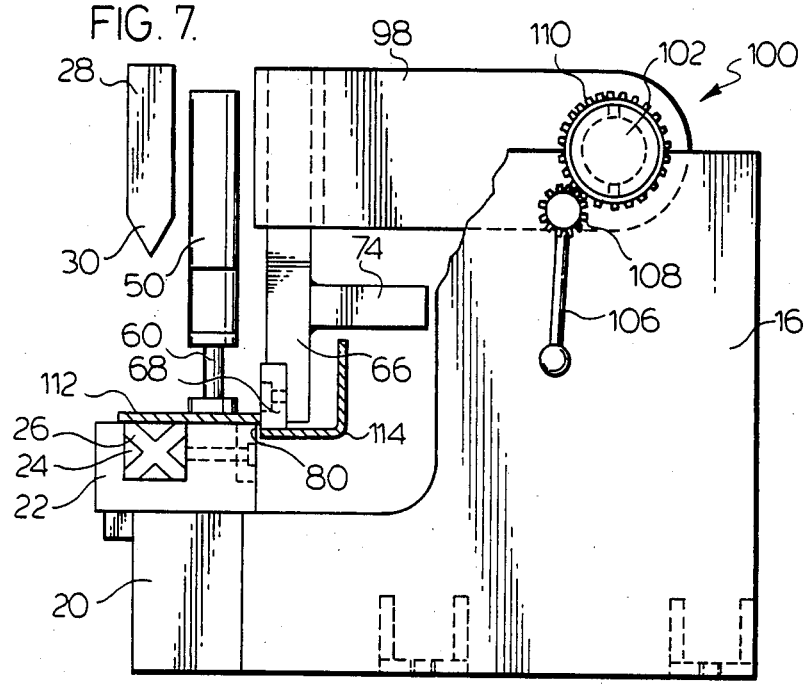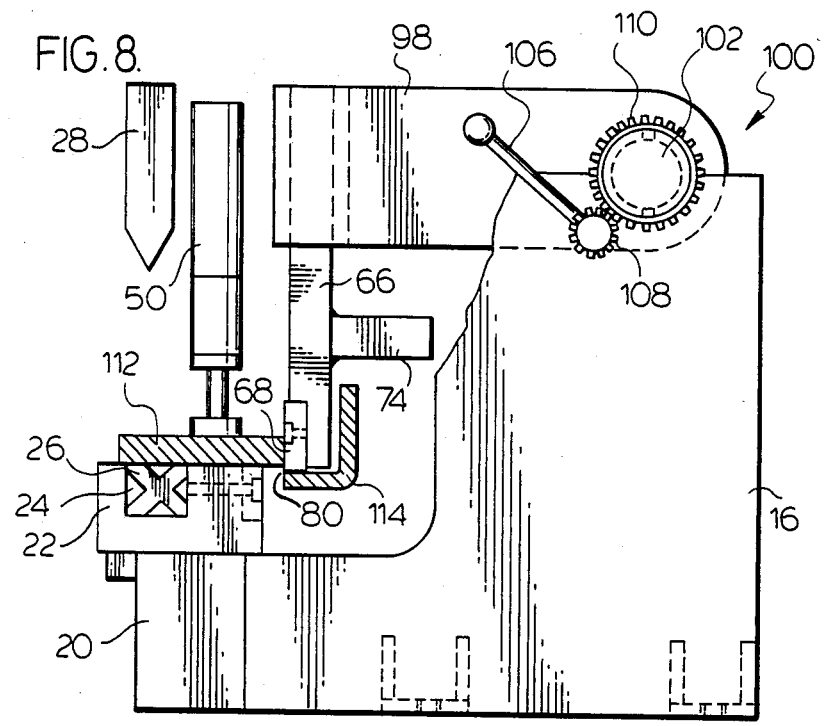

COMBINED BENDING AND CUTTING MACHINE FOR METAL SHEET AND PLATE

This application is a continuation-in-part of application Ser. No. 796,340 filed Nov. 12, 1985, now U.S. Pat. No. 4,646,420 issued Mar. 3, 1987.

This invention relates to machines for bending cutting metal plate.

Metal plate may have a thickness of up to about 1 inch (2.5 cm) or possibly somewhat thicker, and metal plate of such thickness is clearly more difficult to bend and cut than sheet metal which may have a tihckness of up to about 0.25 inches (0.625 cm). In the past, separate machines have usually been provided for bending (commonly known as press brakes) and for cutting metal plate (commonly known as shears). This is expensive because two machines of considerable size have to be purchased together with related accessories such as feed tables. Combined bending and cutting machines have been proposed, but such prior proposals have usually been only suitable for sheet metal or have not been suitable for use in an automated operation.

It is therefore an object of the present invention to provide a combined bending and cutting machine which is not only useful for metal plate but which is also suitable for use in an automated operation.

According to the present invention, a combined bending and cutting machine suitable for bending and cutting metal plate comprises a frame, a female bending die holder extending transversely across a lower part of the frame and supported thereby, the female die holder having a transversely extending upwardly-open recess for receiving a female bending die, and a female bending die located in the recess. A male bending die holder is mounted on the frame above the female die holder for vertical movement relative to the frame and female die holder, a male bending die is mounted on a lower end of the male die holder, and means are provided for effecting vertical movement of the male die holder towards and away from the female die holder to bend metal plate positioned between the male and female bending dies.

The machine in accordance with the invention also includes clamping means mounted for movement relative to the frame, means for effecting said movement to the clamping means, the clamping means having a transversely extending clamping member above the female die holder and movable by said clamp moving means towards and away from the female die holder, said clamping means being operable to clampingly engage a metal plate positioned on the female die holder when the clamping member has been moved towards the female die holder.

The machine also includes shearing means mounted for movement relative to the frame behind the clamping means, means for effecting the movement of the shear means, the shearing means having a transversely extending cutting member with a first cutting edge, and the female die holder having a second transversely extending cutting edge at the rear thereof, the shear moving means being operable to move the cutting member downwardly to cause the first cutting edge to engage the metal plate behind the clamping means, when the clamping means is clampingly engaged with the metal plate, and cooperate with the second cutting edge on the female bending die holder to cut through the metal plate.

The male bending die member may have a pair of laterally spaced projections slidable in vertically extending recesses in the frame to guide the male bending die holder during its vertical movement.

The clamping member may carry a plurality of fluid-pressure-operated clamping devices operable to clampingly engage a metal plate mounted on the female die holder when the clamping member has been moved towards the female die holder. The clamping member may be mounted for a vertical movement relative to the frame, and may have laterally opposite edge portions slidably mounted in vertical recesses in the frame to guide the clamping member during its vertical movement.

The cutting member may be mounted for vertical movement relative to the frame.

A cutting member guide may be mounted for pivotal movement about a horizontal axis substantially perpendicular to the plane of the vertical movement of the cutting member, the guide having a vertically extending recess slidably receiving a lateral edge portion of the cutting member to permit the angle of engagement of the first cutting edge with the metal plate to be adjusted by a predetermined amount according to the thickness of the metal plate.

Means may be provided for moving the cutting member horizontally towards and away from the second cutting edge in accordance with the thickness of the metal plate. Such moving means may comprise a pair of laterally spaced arms each carrying a vertically extending guide in which respective opposite lateral edge portions of the cutting member are slidably received, the arms being carried by adjustable eccentric bearing means mounted on the frame and adjustable to move the first cutting edge towards and away from the second cutting edge.

Figure 2:
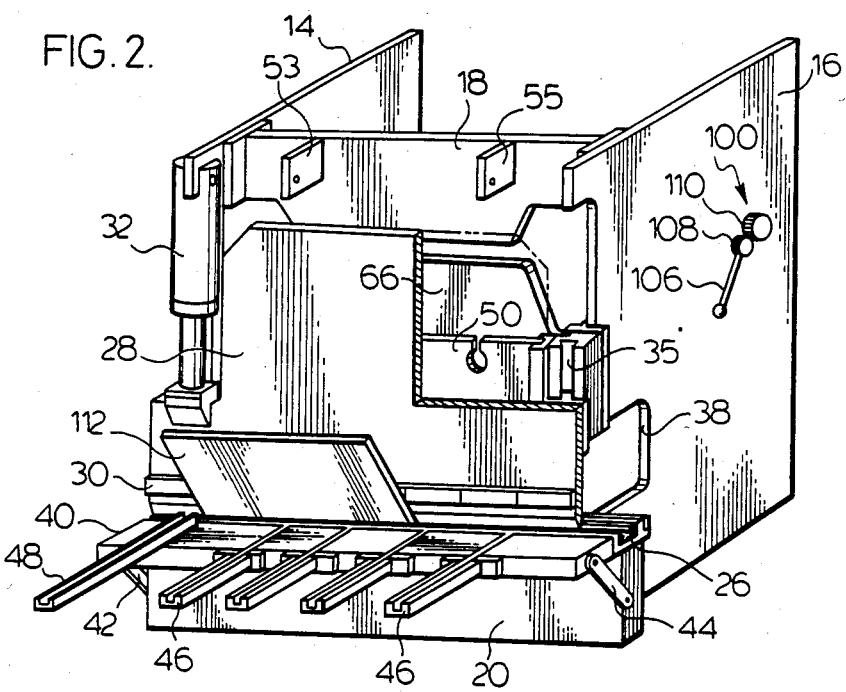
Figure 3:
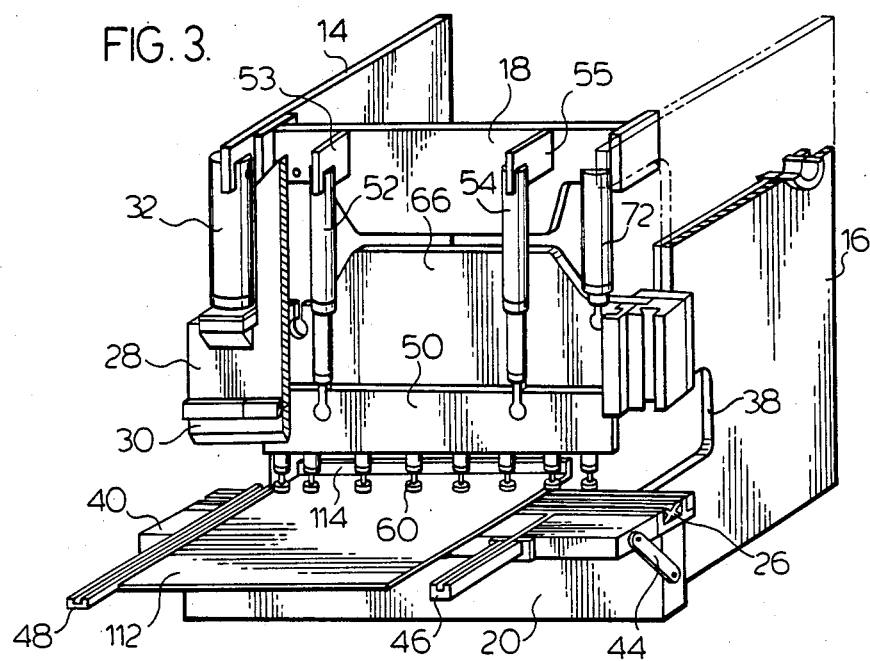
Figure 4:
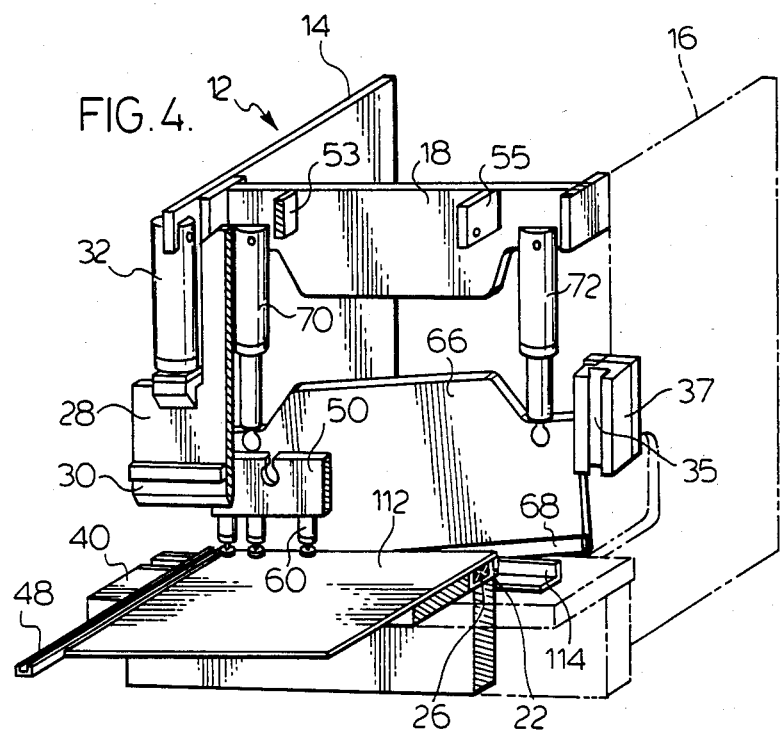
Figure 5:
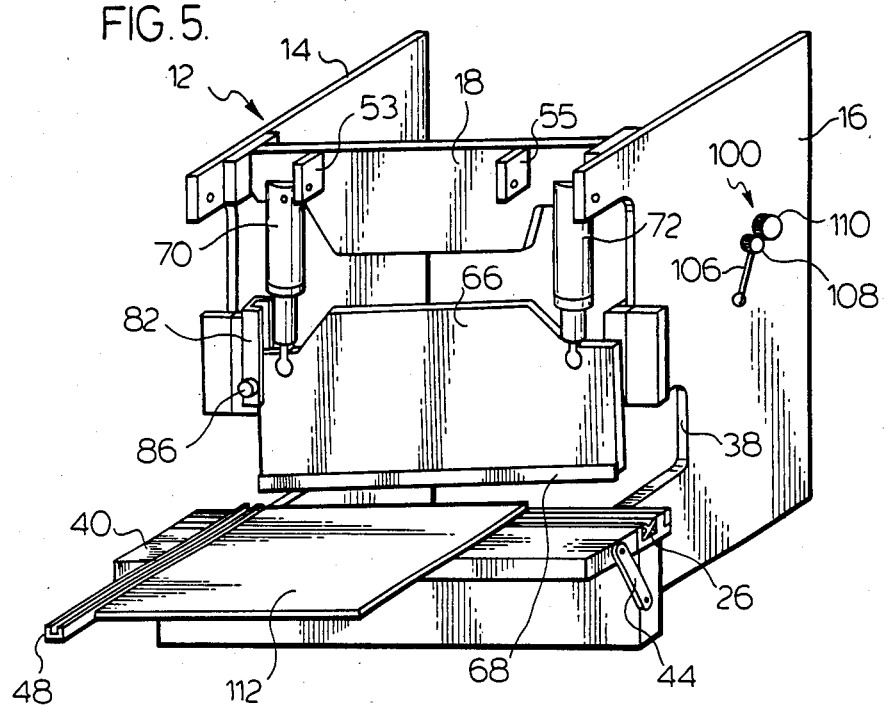
Figure 6:
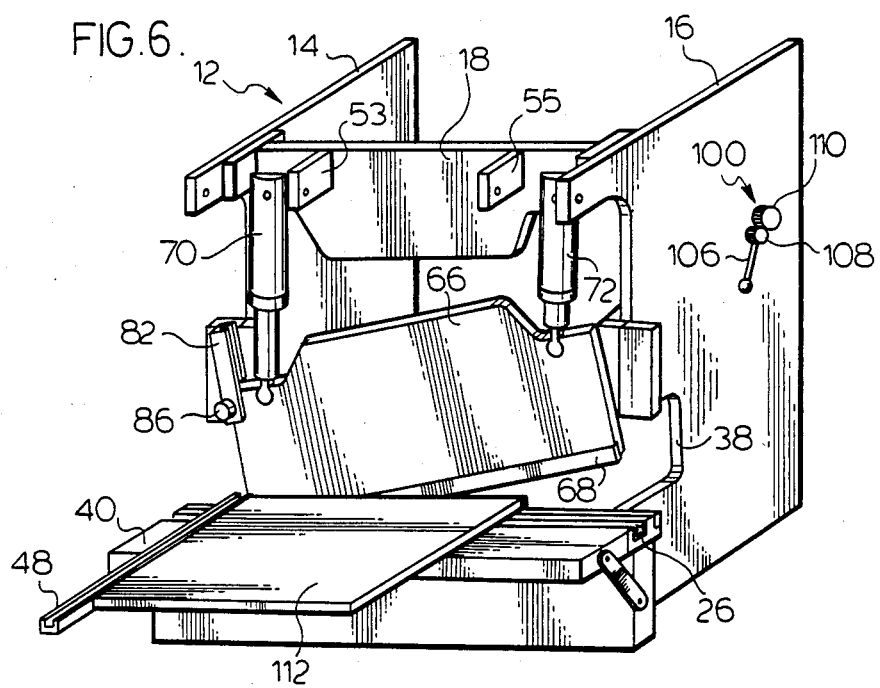
Figure 9:
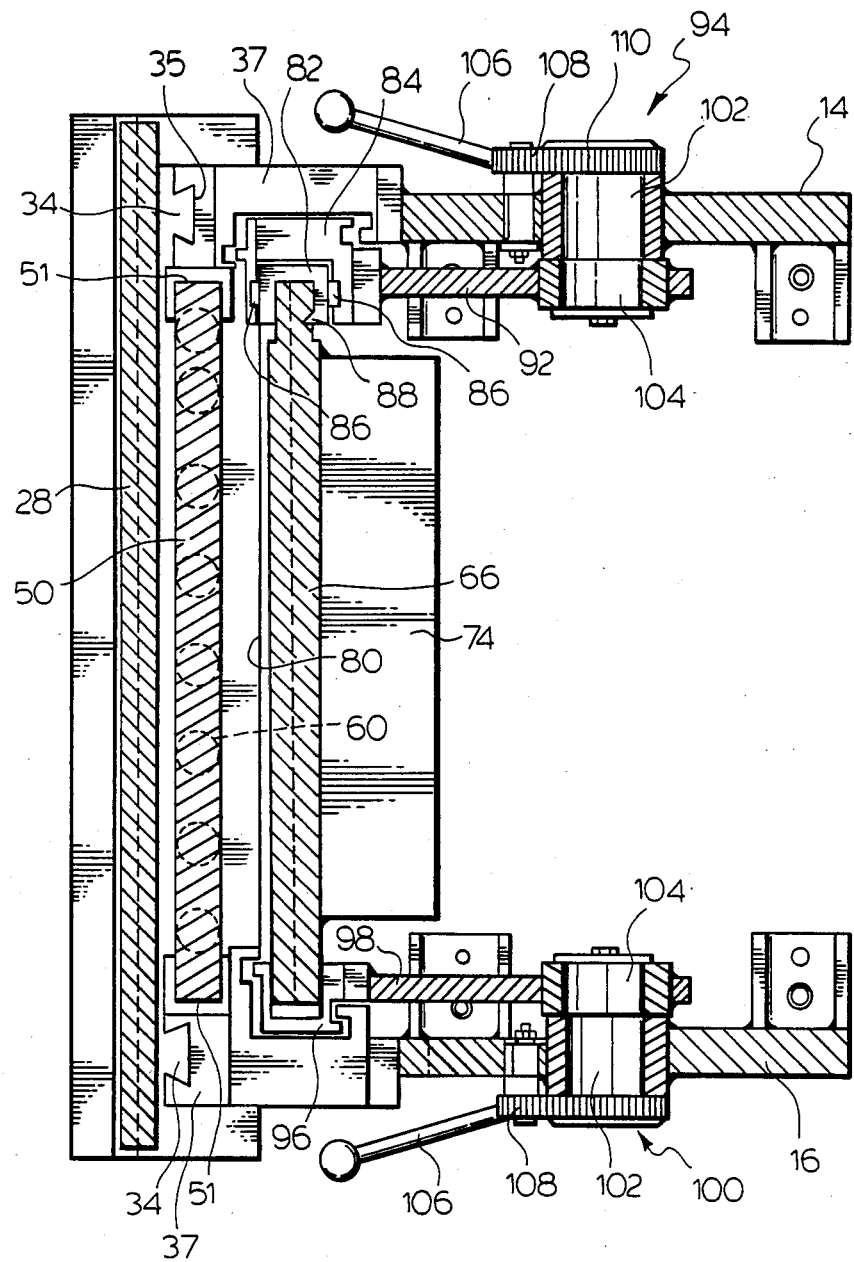
Figure 10:
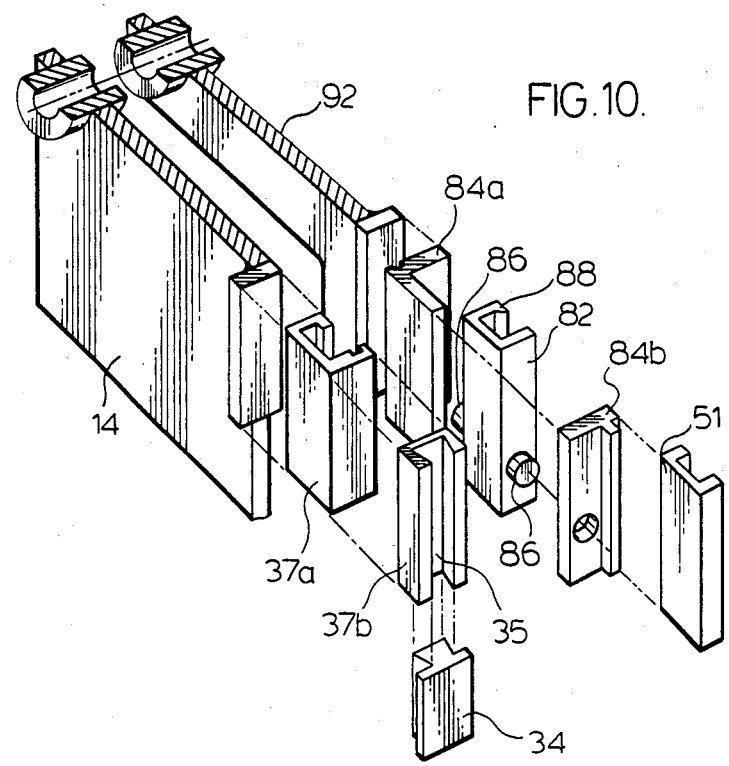
Figure 11:
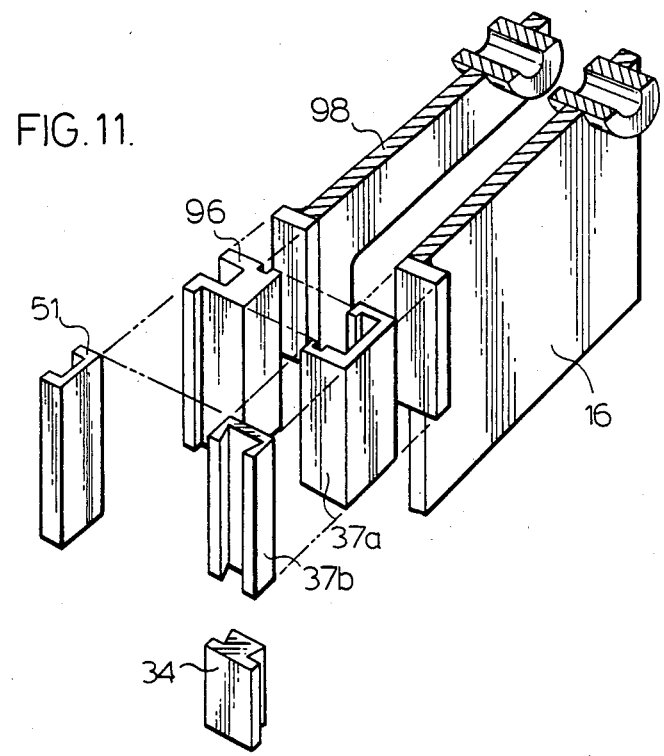

Embodiments of the invention will now be described, by way of example, with reference to the accompanying drawings, of which:

FIG. 1 is a front perspective view of a combined bending and cutting machine for metal plate in accordance with one embodiment of the invention, with parts broken away to show the clamping means, FIG. 2 is a view similar to FIG. 1 but showing the metal plate being bent, FIG. 3 is a similar view showing the bent plate being clamped, FIG. 4 is a similar view showing the bent and clamped plate being cut, FIG. 5 is a view similar to FIG. 4 but showing the cutting means angled for cutting a thin metal sheet, FIG. 6 is a view similar to FIG. 4 but showing the cutting means angled for cutting a thick metal plate, FIG. 7 is a side view showing the cutting means positioned for cutting a thin metal sheet, FIG. 8 is a side view showing the cutting means positioned for cutting a thick metal plate, FIG. 9 is a horizontal sectional view showing the guide means for the bending means, clamping means and cutting means, FIG. 10 is a fragmentary exploded view showing the guide means on the left-hand side of the machine looking at the front, and FIG. 11 is a similar view showing the guide means on the right-hand side.

Referring to the drawings, a combined bending and cutting machine for metal plate has a frame 12 with side walls 14, 16, a transverse upper frame member 18 extending between upper portions of the side walls, and a short vertical front frame member 20 extending across the front of the lower end portions of the side walls 14, 16.

A female bending die holder 22 is mounted on top of the front frame member 20 and extends transversely across the front of the frame 12. The female die holder 22 has a transversely extending upwardly-open recess 24 which receives a female bending die 26. A male die holder in the form of a plate-like member 28 is positioned in a vertical plane at the front of the frame 12 above the female die holder 22, and has a male bending die 30 extending along its lower edge. The male die holder 28 is secured to the lower ends of two transversely-spaced hydraulic rams 32 (only the left-hand one of which is shown) whose upper ends are pivotally secured to the frame side walls 14, 16 respectively.

The male die holder 28 is guided in its vertical travel by two laterally-spaced dovetail projections 34 on its rear face which slide in vertically-extending dovetail grooves 35 in laterally-spaced posts 37 secured to the front ends of the side walls 14, 16. Below the posts 37, the front edge of each side wall 14, 16 is recessed at 36, 38 respectively behind the female die holder 22 and behind the lower part of the male die holder 28 to accommodate metal plate being bent and cut as will be described in more detail later.

A work table 40 is mounted in front of the female die holder 28 by pivoting links 42, 44 at opposite sides extending between the table 40 and the front frame member 20. A series of beams 46 extend forwardly from the table 40 to assist in supporting the metal plate, with an end beam 48 acting as an edge guide. The table 40 is moveable between a raised position as shown in FIG. 1 and lower positions by small hydraulic jacks (not shown).

Clamping means are located behind the female and male die holders 22, 28 and include a transversely extending clamping member 50 secured to the lower ends of two transversely-spaced hydraulic rams 52, 54 whose upper ends are mutually secured to arms 53, 55 projecting forwardly from the transverse upper frame member 18. The clamping member 50 carries a series of hydraulic ram clamps 60 along its lower edge. Opposite lateral edge portions of the clamping member 50 are slidably mounted in vertical grooves 51 in the posts 37 to guide the clamping member 50 in its vertical travel.

Shearing means include a transversely extending cutting member 66 located behind the clamping member 50 and having a first cutting edge 68. The cutting member 66 is secured to the lower ends of two transversely-spaced hydraulic rams 70, 72 whose upper ends are secured to the transverse upper frame member 18. The shearing means also has a reinforcing member 74 extending transversely across the rear face and the cutting member 66. The rear edge of the female die holder 22 carries a transversely extending second cutting edge 80 which cooperates with the first cutting edge 68 as will be described in more detail later.

The shearing means is adjustable to optimize cutting of thin metal sheet and thick metal plates both with respect to the transverse angle of inclination of the first cutting edge 68 and to the spacing of the cutting edge 68 from the second cutting edge 80.

As shown in FIG. 9, the left-hand side edge portion of the cutting member 66 (viewed from the front of the machine) is slidably mounted in a U-shaped guide 82 which is housed in a U-shaped member 84 and pivotally connected thereto at its lower end by lugs 86 which project from the guide 82 into apertures in the member 84. The guide 82 can thus pivot relative to the member 84 about a horizontal axis perpendicular to the plane of vertical movement to the cutting member 86. The guide 82 has a projection 88 engaged in a vertical groove 90 in the cutting member 66 to prevent movement of the cutting member out of the guide 82 in a transverse direction. The member 84 is secured to the front end of an arm 92 whose rear end is secured to a bearing 94 mounted on side wall 14. The right-hand side edge portion of the cutting member 66 is slidably mounted in a U-shaped guide 96 which is secured to the front end of an arm 98, whose rear end is secured to a bearing 100 mounted in side wall 16.

The bearing 94 comprises a bearing pin 102 rotatably mounted in side wall 14. The shear support arm 92 is mounted on an eccentric end portion 104 of the pin 102. The angular-orientation of the bearing pin 102 is adjustable by manually-operable lever 106 which extends from an angularly adjustable toothed gear 108 rotatably mounted on the side wall 14 and engaging a toothed portion 110 at the outer end of bearing pin 102. The bearing 100 is similarly constructed. By adjusting the positions of the levers 106 on opposite sides of the frame, the resultant change in angular orientation of the eccentric pin portion 104 adjusts the position of the shear means so that appropriate adjustments in shear position in accordance with the thickness of a metal sheet plate to be cut can be made.

In use, a metal plate 112 is positioned on the work table 40 with the rear portion of the plate being supported by support beams 46 and with one side edge of the plate abutting the guide beam 48. A front portion of the metal plate extends across and beyond the female die holder 22. At this stage, the male die holder 28, the clamping member 50 and the shear member 66 are all in the raised position as shown in FIG. 1. It will of course be understood that the various hydraulic rams are suitably connected to a source of hydraulic fluid pressure and that appropriate control valves are provided to effect extension and contraction of the hydraulic rams when required, as will be readily apparent to a person skilled in the art. Such hydraulic controls may be manually or automatically operated.

Rams 32 are then extended to move the male die holder 28 downwardly, with the dovetail projections 34 sliding in grooves 35, so that the male die 30 engages the plate 112 and cooperates with the female die 26 to bend the leading end portion 114 of the plate so that it extends perpendicularly to the remainder of the plate as shown in FIG. 2. After the bending operation, rams 32 are retracted to raise the male die holder 28, and the metal plate 92 is pushed further into the machine to position the plate for subsequent cutting of the angled portion 116 from the remainder of the plate 112.

Rams 52, 54 are then extended to lower the clamp member 50 to the position shown in FIG. 3, with the opposite lateral edge portions slidably guided in grooves 51, and clamp rams 60 are extended to firmly clamp the plate 112 against the female die holder 22, as shown more clearly in FIGS. 7 and 8. Rams 70, 72 are then extended to move cutting member 66 downwardly and cause the first cutting edge 68 to engage plate 112 and cooperate with second cutting edge 80 to shear the angled portion 116 from the remainder of the plate 92, as also shown in FIGS. 7 and 8. The cut angled portion 114 falls downwardly between the frame side walls 14, 16 to an appropriate receiving station (not shown). Shear rams 70, 72 and clamp rams 52, 54, 60 are then retracted to ready the machine for the next operation.

As previously mentioned, the cutting means is adjustable to optimize cutting of thin metal sheet and thick metal plate. As shown in FIGS. 5 and 6, the U-shaped guide 82 at one side of the cutting member 66 allows the angle between the cutting edge 68 and the metal sheet or plate 112 to vary between 0 and about 3 degrees, with smaller angles being applicable to thin metal sheet (FIG. 5) and larger angles being applicable to thick metal plate (FIG. 6). The angle is controlled by appropriate operation of the rams 70, 72 by means of a blade angle control valve in a manner which is well known to a person skilled in the art.

As shown in FIG. 7 and 8, the eccentric bearings 94, 100 enable the horizontal distance between the first cutting edge 68 and the second cutting edge 80 to be adjusted from 0 to about 0.1 inch (2.5 mm), with smaller distances being applicable to thin metal sheet (FIG. 7) and larger distances being applicable to thick metal plate (FIG. 8).

The advantages of the invention will be readily apparent from the foregoing description of a preferred embodiment. The described machine can readily bend metal sheet and plate up to a thickness of about 2 inches (5 cm), and can cut metal sheet and plate up to a thickness of about 1.25 inches (3.2 cm). The plate 112 has only to be moved a minimal amount between bending and shearing operations. It will be observed that the female die holder 22 also acts as an anvil during the shearing or cutting operation. A machine in accordance with the present invention replaces conventional separate bending machines (press brakes) and shear machines, thereby saving the expense of requiring two machines. Further, it will be readily apparent that the machine in accordance with the present invention can readily be incorporated into an automated production operation.

Incidentally, in the described embodiment and as shown particularly in FIGS. 10 and 11, the posts 37 are actually formed in two parts 37a, 37b. Similarly, the U-shaped member 84 is formed in two parts 84a, 84b. Also, as shown in FIG. 9, U-shaped member 84 is guided by interengagement with adjacent post 37, and U-shaped guide 96 is itself guided by interengagement with adjacent post 37.

Other advantages of the invention will be readily apparent to a person skilled in the art, the scope of the invention being defined in the appended claims.

What I claim as new and desire to protect by Letters Patent of the United States is:

1. A combined bending and cutting machine suitable for bending and cutting metal plate comprising a fixed frame, a female bending die holder extending transversely across a lower part of the frame and fixedly supported thereby, said female die holder having a transversely extending upwardly-open recess for receiving a female bending die, a female bending die located in the recess, a male bending die holder mounted on the frame above the female die holder for vertical movement relative to the frame and female die holder, a male bending die mounted on a lower end of the male die holder, means for effecting vertical movement of the male die holder towards and away from the female die holder to bend a metal plate positioned between the male bending die and the female bending die in the recess, clamping means operable separately from said male bending die holder and mounted for movement relative to the frame, means for effecting said movement of the clamping means independently of movement of the male bending die holder, the clamping means having a transversely extending clamping member behind said male bending die holder and above the female die holder and movable by said moving means towards and away from said female die holder, said clamping means being operable to clampingly engage a metal plate mounted on said fixed female die holder when the clamping member has been moved towards said female die holder, shearing means operable separately from the male bending die holder and the clamping means and mounted for movement relative to the frame behind the clamping means, means for effecting said movement of the shearing means independently of movement of the male bending die holder and the clamping means, said shearing means having a transversely extending cutting member with a first cutting edge, said female bending die holder having a second transversely extending cutting edge at the rear thereof, and said shear moving means being operable to move the cutting member downwardly to cause said first cutting edge to engage the metal plate behind the clamping means, when said clamping means is clampingly engaged with the metal plate, and cooperate with said second cutting edge to cut through the metal plate.

2. A bending and cutting machine according to claim 1 wherein said male bending die member has a pair of laterally spaced projections slidable in vertical extending recesses in the frame to guide the male bending die holder during its vertical movement.

3. A bending and cutting machine according to claim 1 wherein the clamping member carries a plurality of fluid-pressure-operated clamping devices operable to clampingly engage a metal plate mounted on said female die holder when the clamping member has been moved towards said female die holder.

4. A bending and cutting machine according to claim 1 wherein said clamping member is mounted for vertical movement relative to the frame and has laterally opposite edge portions slidably mounted in vertical recesses in the frame to guide the clamping member during its vertical movement.

5. A bending and cutting machine according to claim 1 wherein the cutting member is mounted for vertical movement relative to the frame.

6. A bending and cutting machine according to claim 5 including a cutting member guide mounted for pivotal movement about a horizontal axis substantially perpendicular to the plane of the vertical movement of the cutting member, said guide having a vertically extending recess slidably receiving a lateral edge portion of the cutting member to permit the angle of engagement of the first cutting edge with the metal plate to be adjusted by a predetermined amount according to the thickness of the metal plate.

7. A bending and cutting machine according to claim 5 including means for moving the cutting member substantially horizontally towards and away from the second cutting edge in accordance with the thickness of the metal plate.

8. A bending and cutting machine according to claim 7 wherein the means for moving the cutting member substantially horizontally comprises a pair of laterally spaced arms each carrying a vertically extending guide in which respective opposite lateral edge portions of the cutting member are slidably received, said arms being carried by adjustable eccentric bearing means mounted on the frame and adjustable to move the first cutting edge towards and away from the second cutting edge.

* * * * *